United States Patent [19]
Ohori

[11] 4,387,875
[45] Jun. 14, 1983

[54] ADJUSTABLE SUPPORT

[76] Inventor: Hiroshi D. Ohori, 20 Bay View Dr., Toms River, N.J. 08753

[21] Appl. No.: 219,229

[22] Filed: Dec. 23, 1980

[51] Int. Cl.³ .............................................. A47G 1/24
[52] U.S. Cl. .................................... 248/480; 248/160
[58] Field of Search .............. 248/480, 160, 284, 276, 248/278, 122, 124, 125; 24/205 R, 204, 205.12, 205.13, 205.15, 203; 211/1.3; 52/121, 108

[56] References Cited

U.S. PATENT DOCUMENTS

| | | | |
|---|---|---|---|
| 2,319,745 | 5/1943 | Napoli | 248/284 X |
| 2,375,462 | 5/1945 | Bender | 52/108 |
| 2,587,111 | 2/1952 | Cashen | 211/1.3 |
| 2,643,745 | 6/1953 | Olszewski | 52/108 |
| 3,242,576 | 3/1966 | Wheeler | 52/108 X |
| 3,537,223 | 11/1970 | Lerchenthal | 52/108 X |
| 4,010,850 | 3/1977 | Persson | 248/276 X |

FOREIGN PATENT DOCUMENTS

| | | | |
|---|---|---|---|
| 649686 | 8/1937 | Fed. Rep. of Germany | 248/160 |
| 803434 | 2/1951 | Fed. Rep. of Germany | 52/108 |
| 1136948 | 5/1957 | France | 52/108 |
| 1445106 | 8/1976 | United Kingdom | 52/108 |

*Primary Examiner*—J. Franklin Foss
*Attorney, Agent, or Firm*—Kenyon & Kenyon

[57] ABSTRACT

The adjustable arm is made up of a pair of flexible members which can be interlocked with respect to each other via pairs of individual blocks which are spaced apart on a flexible strip. The blocks are provided with suitable projections and recesses to interfit into each other when brought together. The interfitting members define a hollow cross-sectional shape which is relatively rigid in an extended position and which provides a passageway for various components such as electrical wiring.

14 Claims, 7 Drawing Figures

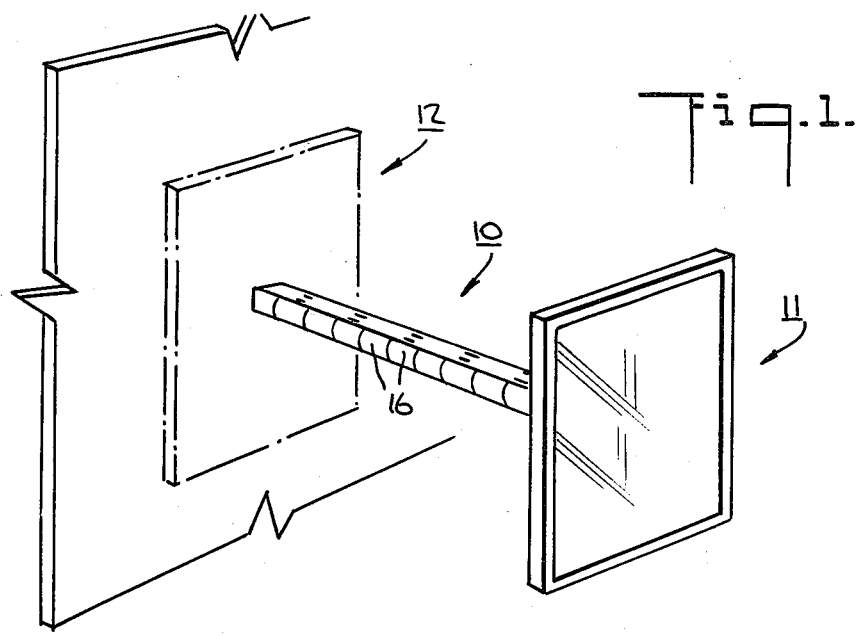
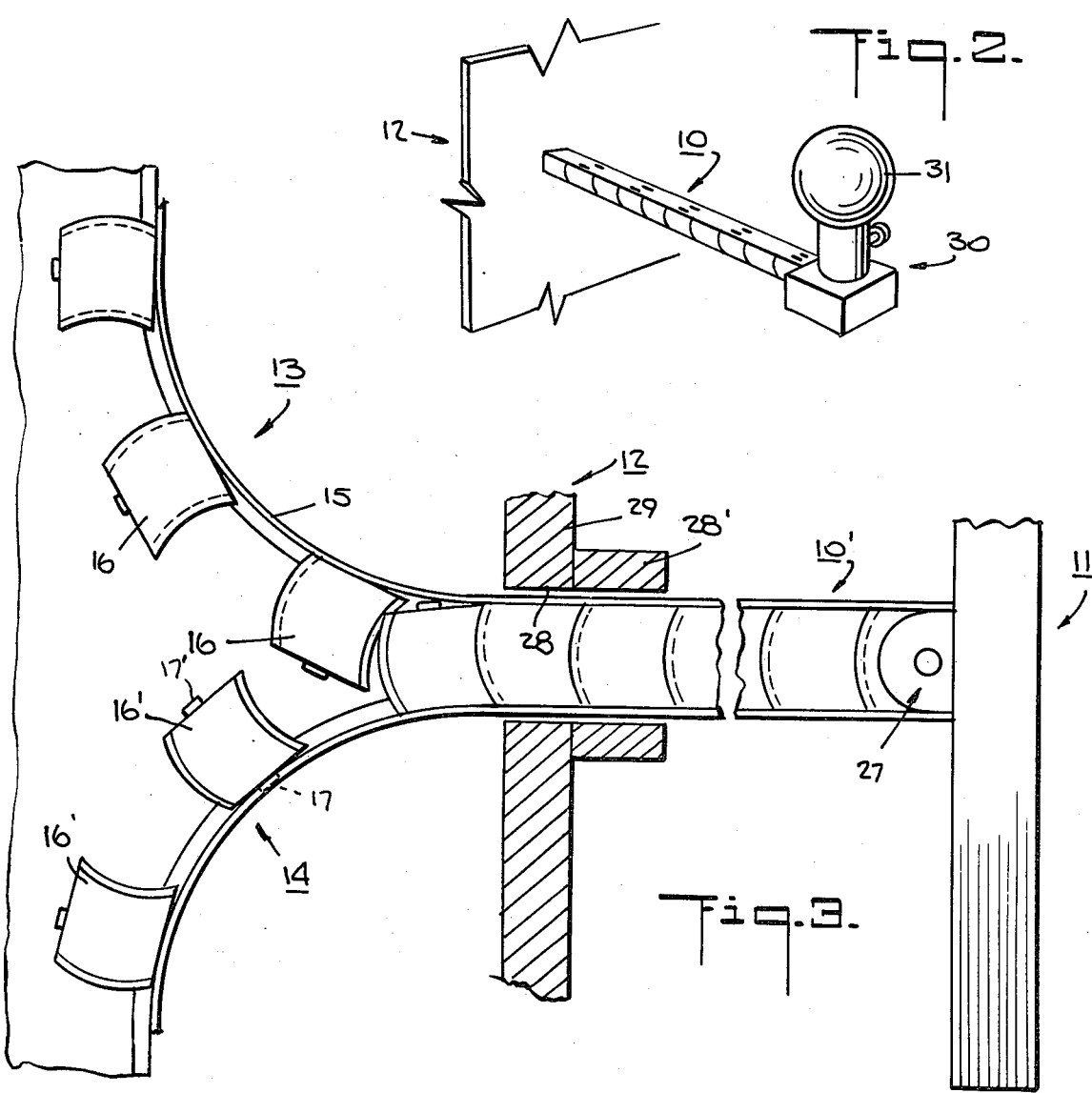

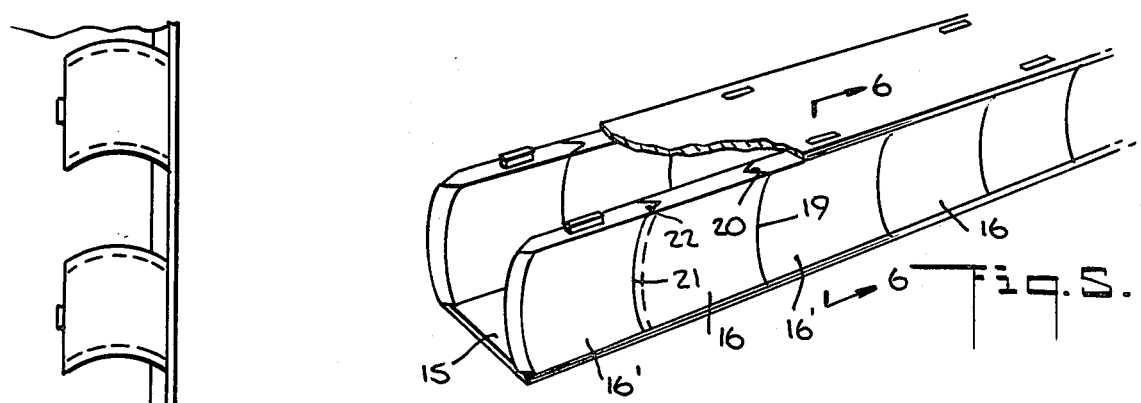
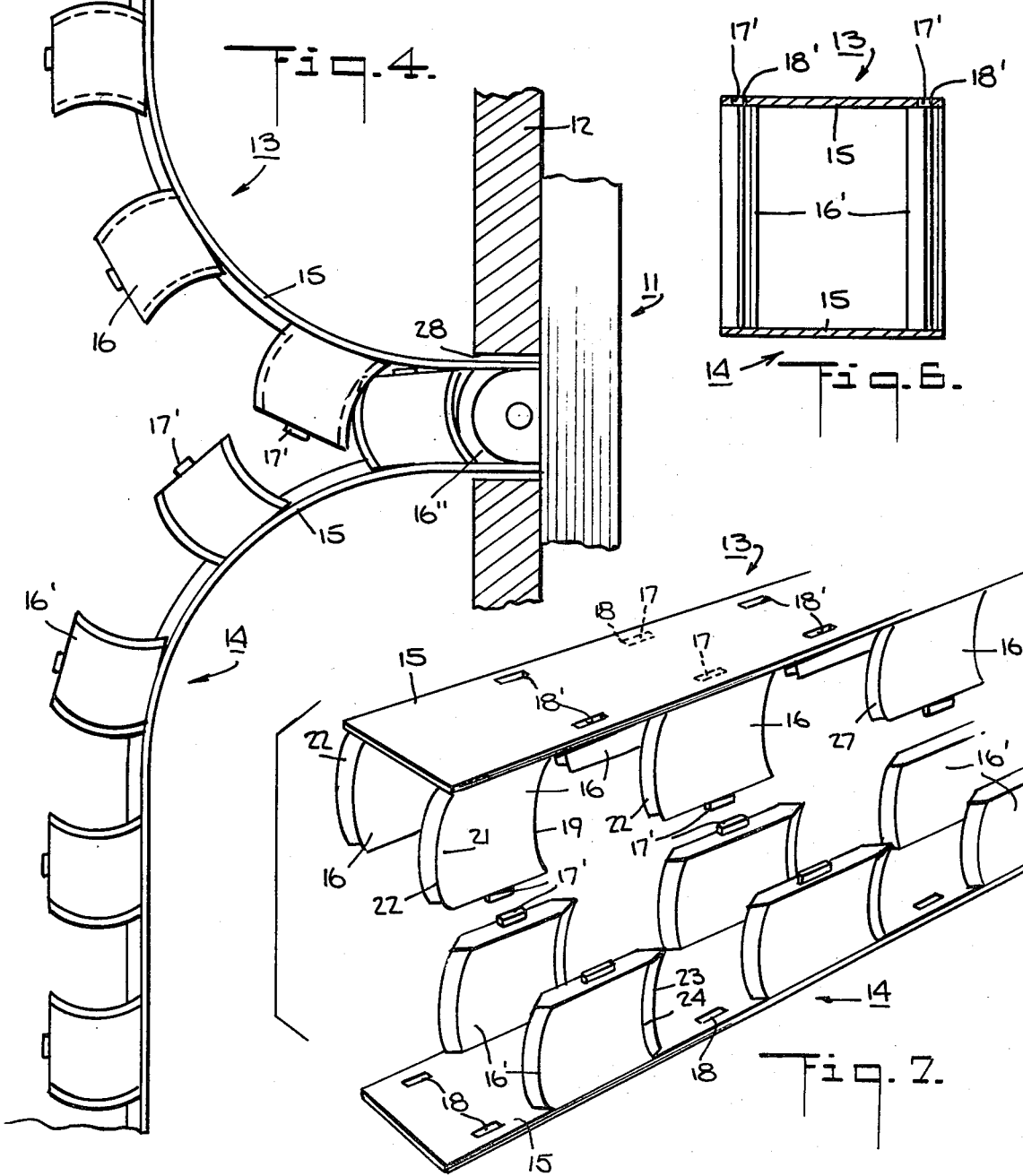

ADJUSTABLE SUPPORT

This invention relates to an adjustable support. More particularly, this invention relates to an adjustable support for supporting bodies, such as mirrors, light supports and the like, in a spatial manner.

Heretofore, various types of adjustable supports have been known for supporting items, such as mirrors, in an adjustable manner on a wall. In such cases, when the mirror is in use, the support can be stretched or elongated to position the mirror in a desired position. When the mirror is not in use, the support can be collapsed into a retracted condition to position the mirror adjacent to the wall. Such collapsible supports are generally constructed of various members which are hinged together to open and close with a scissoring effect. However, over a period of time, the support can become loose so that the mirror cannot be retained in a secure position of use.

It has also been known, for example, from U.S. Pat. Nos. 3,012,635 and 2,643,745, to construct column-type hoists of interfitting members or blocks which define a solid column in order to raise and lower various items. Generally, these hoists are formed of interfitting members which present a solid cross section when interfitted. It has also been known from U.S. Pat. No. 3,213,573 to construct an extensible and retractable member of strips with interfitting edges which, when brought together, define a substantially triangular-shaped rigid member which may be used as a boom, mast, foot bridge, support, and the like. Such a structure may also have a signal cable, hose or duct placed inside the rigid member for simultaneous extension as the member is extended. However, these constructions are relatively cumbersome and require complex mechanisms to interfit and manipulate the various components.

Accordingly, it is an object of the invention to provide an adjustable support which is formed of relatively simple interfitting members which can be manipulated in a relatively simple manner.

It is another object of the invention to provide an adjustable support which can be used in a horizontal or vertical position.

It is another object of the invention to provide an adjustable support which is of relatively rigid structure.

It is another object of the invention to provide an adjustable support which can be easily manipulated manually.

It is another object of the invention to provide an adjustable support having interfitting members which can be readily fitted together in a smooth manner.

Briefly, the invention provides an adjustable support which is comprised of a pair of elongated flexible members which can be interlocked to define a relatively rigid structure. Each flexible member includes a flat strip and two parallel rows of spaced apart blocks disposed along one surface of the strip to define a channel-shaped cross section with the strip. In addition, each block of a member is sized to fit into a space between a pair of adjacent blocks of the other member when the two members are interlocked together.

Each block may also be provided with a projecting tab while the strip of the opposed member has an aperture positioned to receive the tab when the members are fitted together. This enables the blocks to be more readily retained between the two flat strips, for example, should a bending force be imposed on the extended support.

The blocks of the flexible members are suitably shaped to interfit with each other when the members are brought together so as to effect a smooth interlocking fit. To this end, each block of one member has an inwardly curved forward face and an outwardly curved rear face with each face having a longitudinal groove therein. Each block of the other member has an inwardly curved forward face with a projection for reception in an outwardly curved rear face of a block of the opposite member as well as an outwardly curved rear face with a projection for reception in an inwardly curved forward face of a block of the opposite member. These curved forward and rear faces of the blocks permit the blocks to be brought together in a smooth manner.

The blocks may be made of any suitable material such as plastic or metal and can be secured to the respective strips in any suitable manner. For example, where the strips are made of sheet metal while the blocks are made of plastic, each block can be provided with a protrusion for locking into a slot within the metal strip. Alternatively, each block of a side-by-side pair may be slidably mounted on one end of a trunnion which, in turn, is fixed to a pin which is secured to a flat strip in perpendicular relation, e.g. in the manner of a rivet.

The two flexible members are preferably joined together at one end in a permanent interfitted manner so as to be handled as a unit. In this case, when used to support a body, the remote ends of the two members can be wound on spools or slidably disposed in elongated guides or trackways, for example, in opposition to each other within a housing or within a wall, while the forward joined ends are passed through a guide. The support can then be manipulated manually at the joined end so as to be pulled through the guide with the blocks on the trailing sections of the opposed members interfitting and locking together during passage through the guide while unreeling from the spools or sliding through the tracks as the case may be. In this respect, the guide is disposed for guiding the members into interlocked relation with respect to each other during a relative movement of the members through the guide. The support can be retracted to a retracted position in a reverse manner.

The guide may be constructed to support the extended support in a firm cantilever manner and may also be provided with a locking means to lock the members of the support in either or both of a retracted manner or an extended manner. For example, if the flat strips are made of a spring steel and are uncoiled from within a frame through the support, a locking means can be used on the guide to lock the members in an extended position. Upon release of the locking means, the strips would be able to recoil within the frame thus causing a retraction of the support.

Suitable stops may also be provided at the terminal end or ends of the flexible members to prevent a pull out from a guide.

Because of the curvature of the blocks, the blocks do not tend to separate laterally from each other (i.e. in a plane parallel to a row of blocks and perpendicular to the flat strips) in the extended condition of the support. Further, because of the interfitting of the projections of one set of blocks with the grooves of the other set of blocks, the blocks resist separating outwardly of the member (i.e. in a plane parallel to the flat strips and perpendicular to the rows of blocks). Thus, because the blocks of the adjustable support are retained in a fixed position with respect to each other in the extended position, there is no looseness which can occur, for example, as in a hinge joint. Further, should a block become damaged over a period of time, the damaged block can be readily removed and replaced in a relatively easy manner.

When the two members are interlocked together, a hollow rectangular cross-sectional shape is obtained. Thus, when the support is used in a horizontal manner, for example, to support a body, such a mirror or a light support, the support acts as a box beam. As such, the support provides a relatively stiff light-weight cross-sectional shape against bending. In this configuration, either the flat strips or the blocks may define the top and bottom of the beam. When used in a vertical position, the adjustable support acts in the manner of a hollow column. As such, the support is relatively rigid with respect to bending stresses as well as with respect to axial load. Because the blocks are interfitted with respect to each other and can be of substantial thickness relative to the flat strips, a relatively substantial load can be supported.

Since the support provides a hollow cross sectional shape, suitable electrical wiring and the like can be disposed within the interlocked members where the support is used, for example, for a lighting support.

These and other objects and advantages of the invention will become more apparent from the following detailed description taken in conjunction with the accompanying drawings wherein:

FIG. 1 illustrates a perspective view of an adjustable support according to the invention mounting a mirror;

FIG. 2 illustrates a perspective view of an adjustable support according to the invention mounting a light support;

FIG. 3 illustrates a partial side view of the adjustable support of FIG. 1 in an extended position;

FIG. 4 illustrates a view similar to FIG. 3 of the adjustable support in a retracted position;

FIG. 5 illustrates a fragmentary view of the adjustable support of FIG. 1;

FIG. 6 illustrates a view taken on line 6—6 of FIG. 5; and

FIG. 7 illustrates an exploded view of the adjustable support according to the invention.

Referring to FIG. 1, the adjustable support 10 is used to support a body such as a mirror 11 so that the mirror 11 can be adjusted in space relative to a housing or wall 12. To this end, the support 10 is disposed on a horizontal axis and extends from the housing 12.

Referring to FIG. 3, the support 10 is constructed to move between an extended position and a retracted position (see FIG. 4). To this end, the support 10 includes a pair of elongated flexible members 13, 14 each of which includes a flat strip 15, such as a strip of sheet metal and two parallel rows of spaced apart blocks 16, 16', respectively, for example of plastic. The blocks 16, 16' are disposed along opposed surfaces of the respective strips 15 to define a channel-shaped cross section with the respective strip 15 and are sized to fit into a space between a pair of adjacent blocks 16, 16' of the opposed strip 15.

The blocks 16, 16' can be secured to the respective strips 15 in any suitable manner. For example, each block 16, 16' may be provided with a centrally located protrusion 17 which fits into a slot or aperture 18 of the strip 15 in secured manner.

Referring to FIG. 7, each block 16, 16' has a projecting tab 17' on a side opposite the strip 15 to which the block is secured while the opposite strip 15 has a plurality of apertures 18' which are positioned to receive the respective tabs 17'.

As shown in FIGS. 5 and 7, each block 16, for example on the upper member 13, has an inwardly curved forward face 19 which is provided with a longitudinal groove 20 (see FIG. 5) and an outwardly curved rear face 21 which is provided with a similar groove 22. The blocks 16' of the lower member 14 each have an inwardly curved forward face 23 with a projection 24 and an outwardly curved rear face 25 with a projection 26. The respective curved faces of the blocks 16, 16' are complementary to each other such that the projections 23, 26 slide into and interfit in the grooves 20, 22 of adjacent blocks 16 (see FIG. 5). When the members 13, 14 are interfitted with respect to each other, the members define a hollow rectangular cross sectional shape (see FIG. 6).

The ends of the members 13, 14 adjacent to the mirror 11 are interlocked with respect to each other to form the members 13, 14 into a unitary structure. Any suitable connection means 27 can be used to secure ends of the members 13, 14 together. The connection means 27 may also be used to secure the support 10 to the back of the mirror 11. Alternatively, the blocks 16, 16' at this forward end of the support 10 may be fixedly secured to both strips 15 to connect the members 13, 14 together.

Referring to FIG. 3, a guide 28 is disposed within a wall 29 of the housing 12 in order to guide the members 13, 14 into interlocked relation with each other during relative movement of the members 13, 14 through the guide 28 in the direction of the extended position of the support 10. The remote ends of the members 13, 14 are disposed in spaced relation to each other within the housing 12 on opposite sides of the guide 28. In this respect, the remote ends of the members 13, 14 can be wound on supply spools or reels (not shown) which are rotatably mounted within the housing 12 or may be slidably received in elongated guideways or trackways (not shown) within the housing 12.

When in use, the mirror 11 can be moved from a retracted position against the wall 29 of the housing 12 as shown in FIG. 4 to an extended position as shown in FIG. 1. During this time, the support 10 is pulled, e.g. manually, out of the housing 12 while the trailing sections of the members 13, 14 are drawn through the guide 28. At this time, the opposed strips 15 converge towards each other so that the blocks 16, 16' interfit with respect to each other. In addition, the projecting tabs 17' on the respective blocks 16, 16' move into the apertures 18' in the respective strips 15.

When in the extended position, as shown in FIG. 1, the support 10 provides a relatively rigid structure. To this end, the blocks 16, 16' are disposed in a vertical plane and are able to resist bending forces which are imposed thereon, for example, via the mirror 11. At the same time, the strips 15 serve to hold the blocks 16, 16' in place.

The guide 28 may also be formed with an elongated extension 28' which defines a rectangular passageway for the extended support 10 and which serves to more firmly hold the extended support 10 in a cantilevered manner. The guide 28 or extension 28' may also be provided with a locking means (not shown) for locking the members 13, 14 in either or both of the retracted or extended positions. For example, the locking means may constitute a pair of rollers (not shown) on opposite sides of the support 10 with one of the rollers being eccentrically mounted so as to be moved against the support 10 into a locking fit with the opposite roller.

Referring to FIG. 3, the flexible members 13, 14 are located in the housing 12 so that the flexible strips 15 are able to move about smooth curvilinear paths when moving towards or away from the guide 28. Since the blocks 16, 16' are secured at single points to the strip 15, the blocks 16, 16' do not impede the bending of the strips 15 within the curvilinear paths. Further, as the blocks 16, 16' are curved at the forward and rear faces, a smooth interfit is obtained as the blocks become interlocked with each other.

Referring to FIG. 2, the support 10 may also be used to mount a light fixture 30 for a light bulb 31 thereon. Since the support 10 provides a hollow cross-sectional shape (FIG. 5), electrical wiring can be run through the support 10 to the lighting fixture 30 in a concealed manner. Alternatively, any other suitable body, such as a shower head can be mounted on the end of the support 10 for adjustment relative to the housing 12 or other fixed point and can be supplied for example with water via the hollow interior of the extended support 10.

The support 10 may also be used in a vertical disposition so that a body may be raised or lowered over the extent of the adjustability of the support 10.

Should any of the blocks 16, 16' become damaged in use, the block can be easily removed from a flat strip and replaced with a new block. In order to facilitate this, the blocks 16, 16' may alternatively be slidably mounted in side-by-side pairs on one end of a trunnion (not shown) which, in turn, is fixed to a pin which is secured to a strip 15 centrally in perpendicular relation, e.g. in the manner of a rivet. These pins also allow the strips 15 to bend away from the individual blocks 16, 16' at the unsecured portions when rounding a curve.

The invention thus provides an adjustable support which can be mounted in a hidden fashion, for example, within walls, recessed housings and the like, in order to provide a support for various bodies which require position adjustments.

The invention also provides an adjustable support which is made of simple parts of minimum number. Further, when extended, the parts of the support form a secure unitary structure of relatively great rigidity.

What is claimed is:

1. An adjustable support comprising
a pair of elongated flexible members for disposition in an interlocked relation to define a relatively rigid structure; each said flexible member including a flat strip having a plurality of apertures and two parallel rows of spaced apart blocks disposed along one surface of said strip to define a channel-shaped cross section with said strip; each said block of one member being sized to fit into a space between a pair of adjacent blocks of the other member and having a projecting tab in a respective aperture and wherein each block of one member has an inwardly curved forward face with a groove therein and an outwardly curved rear face with a groove therein and each block of the other member has an inwardly curved forward face with a projection thereon for reception in a groove of an outwardly curved rear face of one block of said one member and an outwardly curved rear face with a projection thereon for reception in a groove of an inwardly curved forward face of another block of said one member.

2. A support as set forth in claim 1 wherein said blocks are made of plastic and said strip is made of steel.

3. A support as set forth in claim 1 wherein said members define a hollow rectangular cross sectional shape in said interlocked relation.

4. A support as set forth in claim 1 wherein said members are joined at one end to form a unitary construction.

5. In combination,
a body;
a support secured to said body for adjustably supporting said body in cantilever manner, said support including a pair of elongated members secured at one end to said body, each said member including a flexible strip and two parallel rows of spaced apart blocks disposed along said strip to define a channel-shaped cross section, said members being disposed in interlocked relation with each other adjacent said body with said blocks of said members disposed in alternating interfitted manner, each said member being disposed in spaced relation to the other member remote from said body; and
a guide disposed about said members for guiding said members into interlocked relation with each other during relative movement of said members through said guide between a retracted position and an extended position relative to said guide.

6. The combination as set forth in claim 5 which further comprises a locking means on said guide for locking said members of said support in at least one of said retracted position and said extended position.

7. The combination as set forth in claim 5 wherein said body is a mirror.

8. The combination as set forth in claim 5 wherein said body is a lighting fixture having electrical wiring extending within said interlocked members.

9. The combination as set forth in claim 5 which further comprises a housing having said guide mounted in a wall thereof and having said members housed therein with the remote ends of said members disposed on opposite sides of said guide.

10. The combination as set forth in claim 9 wherein said wall is vertically disposed and said members are interlocked along a horizontal axis extending from said wall.

11. The combination as set forth in claim 5 wherein each block of one member has an inwardly curved forward face with a groove therein and an outwardly curved rear face having a groove therein and each block of the other member has an inwardly curved forward face with a projection thereon for reception in a groove of an outwardly curved rear face of one block of said one member and an outwardly curved rear face with a projection thereon for reception in a groove of an inwardly curved forward face of another block of said one member.

12. The combination as set forth in claim 11 wherein each block of a respective member has a projecting tab and said strip of the other member has a plurality of apertures each positioned to receive a respective tab.

13. The combination as set forth in claim 5 wherein said members define a hollow cross-sectional shape in said interlocked relation.

14. An adjustable support comprising a pair of elongated flexible members for disposition in an interlocked relation to define a relatively rigid structure; each said flexible member including a flat strip and two parallel rows of spaced apart blocks disposed along one surface of said strip to define a channel-shaped cross section with said strip; each said block of one member being sized to fit into a space between a pair of adjacent blocks of the other member and wherein each block of one member has a forward face with a groove therein and a rear face with a groove therein and each block of the other member has a forward face with a projection for reception in a groove of a rear face of one block of said one member and a rear face with a projection for reception in a groove of a forward face of another flock of said one member.

* * * * *